United States Patent
Francis

(10) Patent No.: US 11,196,245 B2
(45) Date of Patent: Dec. 7, 2021

(54) DC POWER SYSTEM BREAKER FOR TRANSPORTATION VEHICLE

(71) Applicant: Shallco, Inc., Smithfield, NC (US)

(72) Inventor: Roderick M. Francis, Smithfield, NC (US)

(73) Assignee: Shallco, Inc., Smithfield, NC (US)

( * ) Notice: Subject to any disclaimer, the term of this patent is extended or adjusted under 35 U.S.C. 154(b) by 98 days.

(21) Appl. No.: 16/455,156

(22) Filed: Jun. 27, 2019

(65) Prior Publication Data

US 2020/0006935 A1    Jan. 2, 2020

Related U.S. Application Data

(60) Provisional application No. 62/690,401, filed on Jun. 27, 2018.

(51) Int. Cl.
| | | |
|---|---|---|
| *H02H 3/087* | (2006.01) | |
| *H02H 5/04* | (2006.01) | |
| *H01H 47/22* | (2006.01) | |
| *H01C 7/02* | (2006.01) | |
| *H01H 47/00* | (2006.01) | |
| *B60R 16/033* | (2006.01) | |
| *H02H 9/02* | (2006.01) | |

(52) U.S. Cl.
CPC .............. *H02H 5/047* (2013.01); *H01C 7/02* (2013.01); *H01H 47/002* (2013.01); *H01H 47/226* (2013.01); *B60R 16/033* (2013.01); *H02H 9/026* (2013.01)

(58) Field of Classification Search
CPC ........ H02H 9/026; H02H 5/047; H01C 7/002; H01H 47/002; H01H 47/226; B60R 16/033
See application file for complete search history.

(56) References Cited

U.S. PATENT DOCUMENTS

| | | | | |
|---|---|---|---|---|
| 3,958,163 | A * | 5/1976 | Clark | ........................ B60L 7/12 |
| | | | | 318/373 |
| 6,628,485 | B1 * | 9/2003 | Rajala | .................... H02H 3/046 |
| | | | | 361/31 |
| 2009/0015976 | A1 * | 1/2009 | Hara | ........................ H02J 1/08 |
| | | | | 361/64 |

(Continued)

*Primary Examiner* — Harry R Behm
(74) *Attorney, Agent, or Firm* — Coats & Bennett, PLLC

(57) ABSTRACT

A thermal hazard protection circuit for a transportation vehicle comprises an interruptible power circuit connected between a power source and load, and a failsafe circuit operative to permanently interrupt current flow under an overcurrent condition. The interruptible power circuit comprises a Positive Temperature Coefficient (PTC) component in series with bi-stable relay configured as a SPST switch. The failsafe circuit comprises a failsafe relay energized by current in the interruptible power circuit. An input of the failsafe relay is connected to the power source, and a normally closed (NC) output (not connected to the input so long as the failsafe relay is energized) is connected to a control input of the bi-stable relay that opens the SPST switch. In an overcurrent condition, the PTC component limits current flow, switching the failsafe relay input to its NC outputs, providing a control signal to open the SPST switch, rendering the interruptible power circuit non-conductive and isolating the load.

13 Claims, 2 Drawing Sheets

(56) References Cited

U.S. PATENT DOCUMENTS

| | | | |
|---|---|---|---|
| 2011/0115296 A1* | 5/2011 | Watson | H02J 9/005 307/66 |
| 2015/0333506 A1* | 11/2015 | Bang | H02H 7/008 361/58 |
| 2019/0273373 A1* | 9/2019 | Li | H01C 7/02 |

* cited by examiner

DC POWER SYSTEM BREAKER FOR TRANSPORTATION VEHICLE

TECHNICAL FIELD

The present invention relates generally to the field of vehicle electrical circuits and in particular to a thermal hazard protection circuit for a transportation vehicle that eliminates thermal hazard from overcurrent conditions.

BACKGROUND

Transportation vehicles, such as city buses and the like, operate on a 12-volt DC electrical power system. A standard load, assumed for design purposes, may draw 90 amperes continuously—not counting intermittent loads. A main power bus breaker, which trips in response to overheating, is designed to never trip at the design point (e.g., 90 amps), but will begin tripping based on a time over that current. For example, a 300 amp current will cause the main breaker to trip in approximately 10 seconds.

Buses increasingly have electrically-powered peripheral or accessory systems added, such as, e.g., radios and navigation electronics, fans or small air conditioners, wheelchair ramps, bicycle holders, public address (PA) systems, entertainment monitors, and the like. The decisions to add such systems involve consideration of the costs, functionality, regulatory restrictions, and even politics—but rarely include analysis of the vehicle electrical bus and the effect of added loads. The "time over current" operation of thermal breakers masks the deleterious effects of the added load due to some accessories. For example, wheelchair ramps are infrequently used, and when they are it is for brief durations. However, other accessories, such as fans, may run continuously. One all-too-common result of the haphazard amalgamation of accessories on transportation vehicles is overheating of the wiring or other electrical components during the time design current draw is exceeded but before the main breaker trips, often resulting in vehicle fires.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a thermal hazard protection circuit for a transportation vehicle comprises an interruptible power circuit connected between a power source and load, and a failsafe circuit operative to permanently interrupt current flow under an overcurrent condition. The interruptible power circuit comprises a Positive Temperature Coefficient (PTC) component in series with bi-stable relay configured as a SPST switch. The failsafe circuit comprises a failsafe relay energized by current in the interruptible power circuit. An input of the failsafe relay is connected to the battery, and a normally closed (NC) output (not connected to the input so long as the failsafe relay is energized) is connected to a control input of the bi-stable relay that opens the SPST switch. In an overcurrent condition, the PTC component limits current flow, switching the failsafe relay input to its NC outputs, providing a control signal to open the SPST switch, rendering the interruptible power circuit non-conductive and isolating the load.

One embodiment relates to a thermal hazard protection circuit for a transportation vehicle including a battery having positive and negative terminals, and one or more loads. The thermal hazard protection circuit includes an interruptible power circuit connected between the battery and the load. The interruptible power circuit comprises a first positive temperature coefficient (PTC) component operative to limit current through the interruptible power circuit to a first predetermined current value in response to heat in excess of a first predetermined thermal value; and a bi-stable relay connected in series with the first PTC component and operative to selectively open or close the interruptible power circuit. The thermal hazard protection circuit further includes a failsafe circuit connected between the interruptible power circuit and a first control input of the bi-stable relay operative to cause the bi-stable relay to open the interruptible power circuit in response to the first PTC component limiting current through the interruptible power circuit.

Another embodiment relates to a method of protecting a transportation vehicle electrical circuit, comprising a battery having positive and negative terminals and one or more loads, from thermal hazard. Current from the battery is directed to the load through an interruptible power circuit connected between the battery and load. The interruptible power circuit comprises a series connection of a first positive temperature coefficient (PTC) component, operative to limit current to a first predetermined current value in response to heat in excess of a first predetermined thermal value, and a bi-stable relay. The bi-stable relay is closed. A first normally closed output terminal of a failsafe relay is held open. An input terminal of the failsafe relay is connected to the battery positive terminal. The first normally closed output terminal is connected to a first control input of the bi-stable relay operative to open the bi-stable relay. In response to the first PTC component limiting current through the interruptible power circuit, the failsafe relay is deenergized, allowing the first normally closed output terminal to connect the battery positive terminal to the bi-stable relay first control input to open the bi-stable relay.

BRIEF DESCRIPTION OF DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

The present invention relates to a thermal hazard protection circuit, particularly suited for transportation vehicles, which fully protects the vehicle electrical system from the adverse effects of high currents due to extended loads. However, the present invention is not limited to such application, and may find utility in a broad range of applications.

Figure 1:
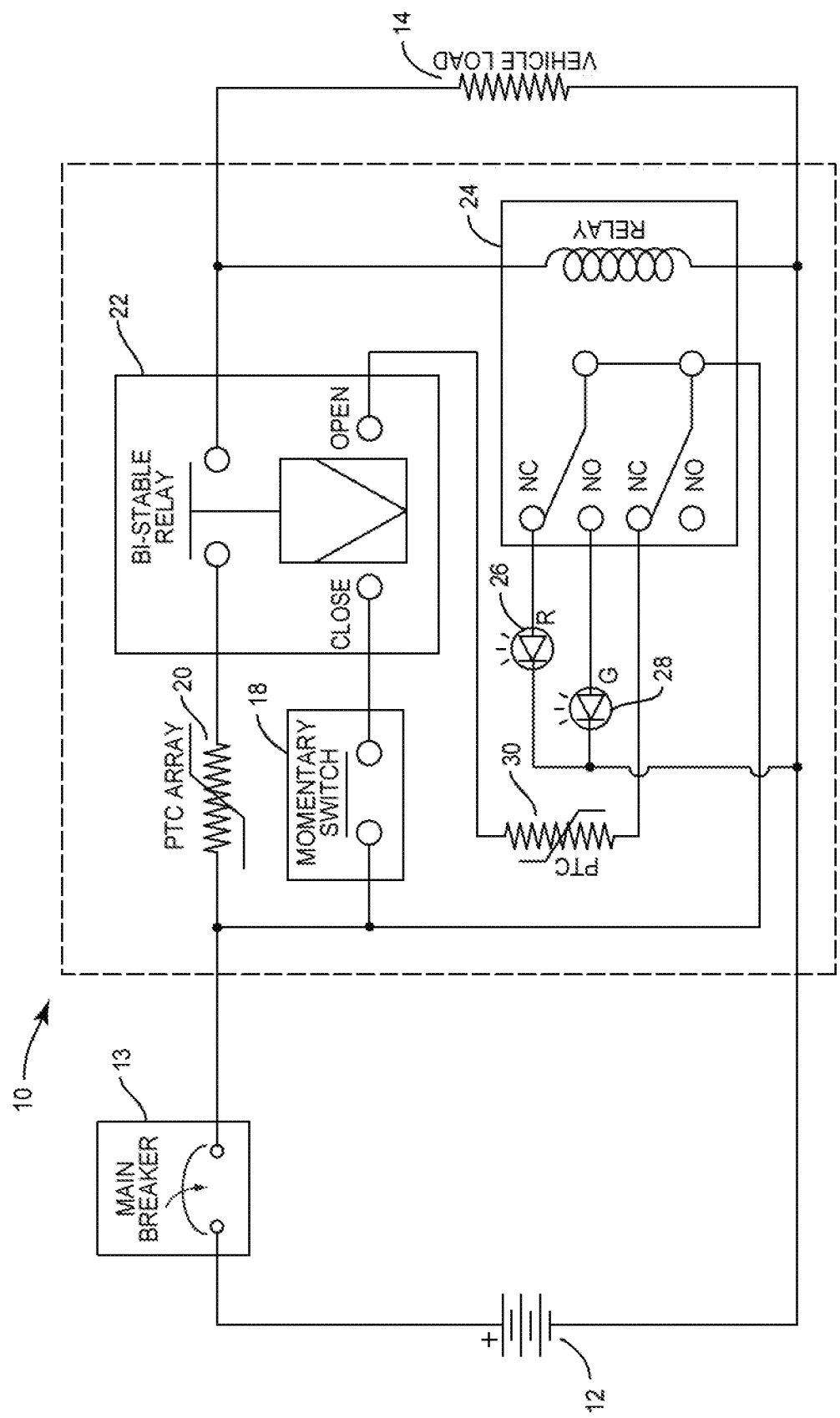
FIG. 1 is a schematic diagram of a thermal hazard protection circuit for a transportation vehicle.

FIG. 1 depicts an electrical schematic diagram of a thermal hazard protection circuit 10, interposed between a battery 12, with an existing main breaker 13, and one or more loads 14, such as on a transportation vehicle. As those of skill in the art are aware, a battery 12 provides starting power for a vehicle. During normal operation of the vehicle, an alternator or generator (not shown) driven by the engine provides electrical power for the vehicle, and to recharge the battery. In FIG. 1, the battery 12 is representative of all electrical power sources on the vehicle.

The thermal hazard protection circuit 10 comprises an interruptible power circuit and a feedback circuit. The interruptible power circuit, comprising a Positive Temperature Coefficient (PTC) component 20 connected in series with a bi-stable relay 22, is connected between the battery 12 (through the main breaker 13) and the load(s) 14. The failsafe circuit, comprising a failsafe relay 24, is connected in a feedback configuration. The failsafe relay 24 is operative to cause the bi-stable relay 22 to open, thus interrupting all current flow in the interruptible power circuit, in response to the PTC component 20 limiting current through the interruptible power circuit when excess current generates high heat. The structure and function of these circuit 10 components are introduced below, followed by a description of their interoperation in the thermal hazard protection circuit 10, followed by various optional enhancements to the circuit 10.

A PTC resistor is a passive resistive device that exhibits a threshold change in resistance in response to temperature. A PTC resistor exhibits a low resistance at room temperature. The resistance of a PTC resistor increases slightly at higher temperature, up to a "trip" temperature. Once tripped, the PTC resistor exhibits a very high resistance that is substantially constant with further increases in temperature. The trip point resistance allows only enough current flow to maintain the tripped state. The PTC resistor is self-healing; upon cooling below the trip temperature, it resumes a low resistance. The PTC resistor does not depend on any time/temperature relationship, as many bi-metal relays do, but rather trips immediately when the trip temperature is reached. As used herein a "PTC component" refers to a circuit component comprising one or more PTC resistors. The PTC resistors may be arranged in parallel, serial, or serial-parallel configuration, to achieve a desired operating resistance, trip point, and other salient parameters. The PTC resistor(s) in a PTC component may be assembled together into a physical package, or may be distributed, such as on a printed circuit board.

A bi-stable relay 22 is a switching component having selectable, stable contact positions, which persist regardless of the input state, and even through the removal of power. In one configuration (used in the thermal hazard protection circuit 10), a bi-stable relay 22 has one input terminal and two output terminals. The input terminal is selectively connected to one output terminal or the other, in the alternative, in response to two independent control inputs. A pulse to a first control input connects the input terminal to a first output terminal, which connection is "latched," or stable. A subsequent pulse to a second control input switches the input terminal to be connected to the second output terminal, where it remains until a subsequent pulse to the first control input. Once set by one control input or the other, the bi-stable relay retains its terminal connections, regardless of the input state, or even through the removal and reapplication of supply power.

In the thermal hazard protection circuit 10, the input of the bi-stable relay 22 is connected to the first PTC component 20, and one output is connected to the load 14. The other output of the bi-stable relay 22 is not used. Hence, the bi-stable relay 22 operates as a single-pole, single-throw (SPST) switch, the state of which is controlled by pulses to two control inputs. Pulsing a first control input, labeled OPEN in FIG. 1, connects the input to the unused output, effectively opening the SPST switch, injecting an open circuit condition into the interruptible power circuit and rendering it non-conductive—thus electrically isolating the load 14. Pulsing a second control input, labeled CLOSE in FIG. 1, connects the input to the output that is connected to the load 14, effectively closing the SPST switch, rendering the interruptible power circuit conductive, and passing current from the battery 12, through the first PTC component 20, and on to the load 14. Accordingly, the bi-stable relay 22 may be referred to herein as a "SPST switch" or having a "SPST switch function."

The failsafe relay 24 is a conventional double-pole, single-throw (SPDT) relay. As well known in the art, a SPDT relay has one input connected, in the alternative, to one of two pairs of outputs. When little or no current flows through an energizing coil, the input is connected to both of two normally closed (NC) outputs. When sufficient current flows through the energizing coil, its electromagnetic effect switches the input to disconnect from the NC outputs, and instead connect to both of two normally open (NO) outputs.

The interruptible power circuit and feedback circuit form the core of the thermal hazard protection circuit 10. Additional, optional components include a momentary switch 18, a second PTC component 30, a hazard visual indicator 26, such as a red LED, and a safe operation visual indicator 28, such as a green LED. In any given implementation, additional components may be required or desired, such as current-limiting resistors and the like. The placement and specification of such components is well within the skill of those of ordinary skill in the art, given the teaching of the present disclosure.

During operation, the main breaker 13 is assumed to be in a closed, or conductive, state, connecting the battery 12 with the interruptible power circuit comprising the first PTC component 20 and bi-stable relay 22. When manually actuated, the momentary switch 18, connected between the battery 12 and the CLOSE control input of the bi-stable relay 22, closes the SPST switch to which the bi-stable relay 22 is configured. The interruptible power circuit thus provides a closed circuit, allowing current to flow between the battery 12 and the load 14.

During normal use, with loads 14 drawing only the designed power, current through the interruptible power circuit is insufficient to generate enough heat to reach the trip point of the first PTC component 20. Accordingly, current is supplied to the load(s) 14 with minimal loss. A small portion of the current flowing from the bi-stable relay 22 is diverted to energize the coil of the failsafe relay 24. This connects the failsafe relay 24 input (connected to the positive terminal of the battery 12) to the NO outputs, one of which is unconnected. The other NO output is connected to a safe operation visual indicator 28. In one embodiment, the safe operation visual indicator 28 comprises a green LED; in another embodiment, it may comprise an incandescent bulb. The opposite side of the safe operation visual indicator 28 is connected to the negative terminal of the battery 12. Current flowing through the safe operation visual indicator 28 illuminates the component, providing a positive visual indication that the thermal hazard protection circuit 10 is operative, and that operating conditions do not present a thermal hazard.

As discussed above, the main power bus breaker 13 operates on a "time over current" basis—for example, a breaker 13 specified for a design current of 90 amps may pass a 300 amp current for some 10 seconds before tripping. This high current, even for a brief duration, may present a thermal hazard to components or wiring of the vehicle electrical system.

During periods of heavy current flow through the interruptible power circuit, the first PTC component 20 heats up. When the first PTC component 20 reaches its characteristic trip temperature, it exhibits a very high resistance, limiting the current to a very low value, such as on the order of 0.5 A. The first PTC component 20 thus largely interrupts current flow to the load 14, protecting the system from run-away thermal overload due to high current, thus protecting the system against fire hazard.

In tripping, the first PTC component 20 also severely limits current flowing through the energizing coil of the failsafe relay 24. This current is insufficient to maintain the relay input connection to the NO outputs, and it switches instead to connect to the NC outputs. One NC output connects to the OPEN control input of the bi-stable relay 22, causing the bi-stable relay 22, configured as a SPST switch, to open, causing an open circuit condition in the interruptible power circuit, thus rendering it non-conductive. The bi-stable relay 22 ensures that the non-conductive state is permanent. Even if loads 14 are removed, reducing the current demand, the bi-stable relay 22 will maintain an open circuit condition in the interruptible power circuit until it is reset by manual operation of the momentary switch 18.

In one embodiment, a second PTC component 30 is interposed between the NC output terminal of the failsafe relay 24 and the OPEN control input of the bi-stable relay 22. The second PTC component 30 is selected to have a relatively low trip point, which is reached within a few seconds of current flow. This limits the duration of the OPEN control pulse to the bi-stable relay 24. Bi-stable relays typically have hot coils, which can be damaged by long control pulses. Once a brief pulse from the failsafe relay 24 opens the bi-stable relay, no further control input is necessary; the bi-stable relay 24 will maintain the open circuit condition until the hazard is addressed and the bi-stable relay 24 is again closed by manual operation of the momentary switch 18 (which should also be only of a very brief duration).

De-energizing the failsafe relay 24 also connects its input to the other NC output terminal. In one embodiment, this NC output is connected to a hazard visual indicator 26. In one embodiment, the hazard visual indicator 26 comprises a red LED; in another embodiment, it may comprise an incandescent bulb. The opposite side of the hazard visual indicator 26 is connected to the negative terminal of the battery 12. Current flowing through the hazard visual indicator 26 causes it to illuminate, providing a positive visual indication that operating conditions present a thermal hazard, and that the thermal hazard protection circuit 10 has triggered to protect the vehicle.

Figure 2:
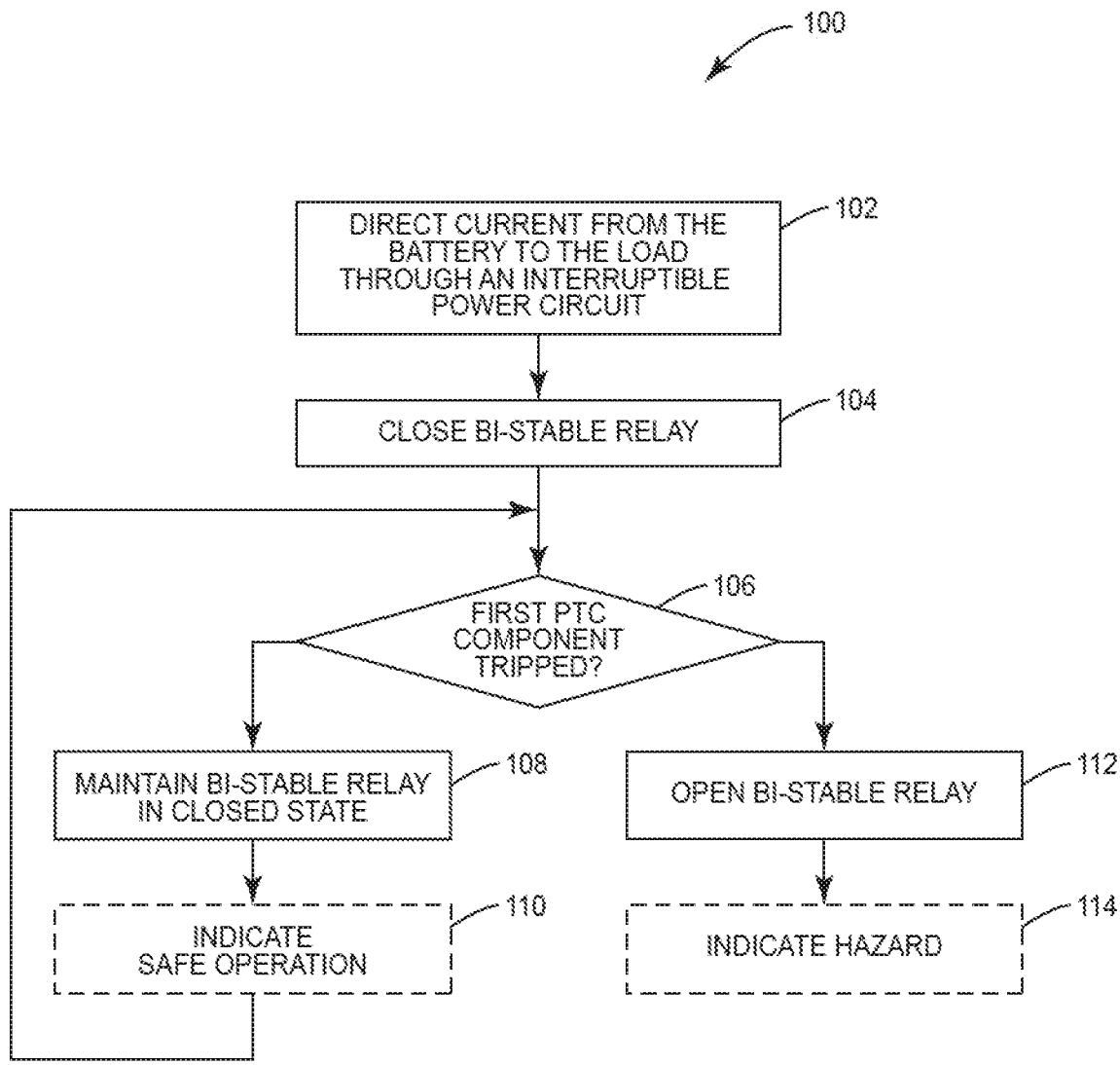
FIG. 2 is flow diagram of a method of protecting a transportation vehicle electrical circuit from thermal hazard.

FIG. 2 depicts the steps in a method 100 of protecting a transportation vehicle electrical circuit, comprising a battery 12 having positive and negative terminals and one or more loads 14, from thermal hazard. Current from the battery 12 is directed to the load 14 through an interruptible power circuit connected between the battery 12 and load 14 (block 102). The interruptible power circuit comprises a series connection of a first PTC component 20, operative to limit current to a first predetermined current value in response to heat in excess of a first predetermined thermal value, and a bi-stable relay 22. The bi-stable relay 22, configured as a SPST switch, is closed, rendering the interruptible power circuit conductive (block 104). As long as the first PTC component 20 has not tripped (block 106), current in the interruptible power circuit does not present a thermal hazard. In this case, the bi-stable relay 22, configured as a SPST switch, is maintained in a closed state, keeping the interruptible power circuit conductive (block 108). A visual indication of safe operation may also be generated (block 110). Control of the method 100 then flows to block 106 monitoring the state of the first PTC component 20 (indeed, those of skill in the art will recognize that blocks 106, 108, and 110 are not in fact sequential, but operate simultaneously).

According to embodiments disclosed herein, the bi-stable relay 22, configured as a SPST switch, is maintained in a closed state (block 108) by a failsafe relay 24 having a coil energized by current from the interruptible power circuit and holding its contacts away from a position that would send a pulse to open the bi-stable relay 22. In particular, the bi-stable relay 22 OPEN control input is connected to a normally closed (NC) terminal of the relay 24 (the input of which is connected to the positive terminal of the battery 12). As those of skill in the art are aware, the "normally closed" description indicates that, if the failsafe relay 24 is not energized, the failsafe relay 24 input will connect to the NC output(s). Current flowing in the interruptible power circuit, and hence through the failsafe relay 24 coil, is thus necessary to keep the failsafe relay 24 input unconnected to the NC output. Stated differently, the bi-stable relay 22, configured as a SPST switch, will open unless current continuously flows in the interruptible power circuit. Maintaining the bi-stable relay 22 as a closed SPST switch (block 108) is thus accomplished by a form of "dead man's switch"—if sufficient current fails to flow in the interruptible power circuit (and hence through the failsafe relay 24 coil), the bi-stable relay 22 will open the interruptible power circuit.

If enough excess current flows in the interruptible power circuit to generate sufficient heat to trip the first PTC component 20 (block 106), the tripped first PTC component 20 will severely curtail the current flow. This will deenergize the failsafe relay 24, connecting the failsafe relay 24 input to the NC outputs, and providing a positive signal to the OPEN control input of the bi-stable relay 24. This will connect the input of the bi-stable relay 24 to an unconnected output, leaving the output connected to the load in an open circuit condition. That is, the SPST switch function of the bi-stable relay 22 is placed in an open state (block 112), preventing all current flow in the interruptible power circuit. A visual indication of the thermal hazard may also be generated (block 114). This terminates the method 100.

In one embodiment, the function of block 112 further comprises terminating the positive signal provided to the OPEN control input of the bi-stable relay 22—that is, rendering it a pulse—by operation of a second PTC component 30 interposed between the failsafe relay 24 NC output terminal and the bi-stable relay 22. The second PTC component 30 has a low trip point, and will trip after a few seconds of current flow. This limits the length of the OPEN control pulse sent to the bi-stable relay 22, for protection of that circuit component.

The present invention has been described herein with respect to protecting the main electrical bus of a transportation vehicle, such as a bus. However, those of skill in the art will recognize that a broad variety of vehicles may benefit from the thermal protection of the present invention. As used herein, the term "vehicle" is broadly defined, and includes any self-propelled human transportation mechanism that includes a battery, alternator, or generator, and one or more high-current loads. As such, the term "vehicle" includes, for example, automobiles, trucks, buses, motorcycles, All Terrain Vehicles (ATVs), boats or ships, aircraft, trains, recreational vehicles (RVs), and the like.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A thermal hazard protection circuit for a transportation vehicle including a power source having positive and negative terminals, and one or more loads, comprising:
   an interruptible power circuit connected between the power source and the load, the interruptible power circuit comprising:
      a first positive temperature coefficient (PTC) component operative to limit current through the interruptible power circuit to a first predetermined current value in response to heat in excess of a first predetermined thermal value; and
      a bi-stable relay connected in series with the first PTC component and operative to selectively open or close the interruptible power circuit;
   a failsafe circuit connected between the interruptible power circuit and a first control input of the bi-stable relay operative to cause the bi-stable relay to open the interruptible power circuit in response to the first PTC component limiting current through the interruptible power circuit;
   whereby, once opened by the failsafe circuit, no power is required to maintain the interruptible power circuit in the open state.

2. The thermal hazard protection circuit of claim 1 wherein the failsafe circuit comprises a failsafe relay, comprising:
   an energizing coil connected between the interruptible power circuit and the battery negative terminal;
   an input terminal connected to the battery positive terminal; and
   a first normally closed output terminal connected to the first control input of the bi-stable relay.

3. The thermal hazard protection circuit of claim 2 further comprising a second PTC component interposed between the failsafe relay first normally closed output terminal and the bi-stable relay first control input, the second PTC component operative to limit current through it to a second predetermined current value in response to heat in excess of a second predetermined thermal value.

4. The thermal hazard protection circuit of claim 2 wherein the failsafe relay is a single pole dual throw relay, and further comprising a second normally closed output terminal connected to a hazard indicator.

5. The thermal hazard protection circuit of claim 4 wherein the hazard indicator comprises a light-emitting device connected between the failsafe relay second normally closed output terminal and the power source negative terminal.

6. The thermal hazard protection circuit of claim 2 wherein the failsafe relay further comprises a normally open output terminal connected to a safe operation indicator.

7. The thermal hazard protection circuit of claim 1 further comprising a momentary switch connected between the power source positive terminal and a second control input of the bi-stable relay operative to cause the bi-stable relay to close the interruptible power circuit.

8. The thermal hazard protection circuit of claim 1 wherein the interruptible power circuit further comprises a master switch connected between the power source positive terminal and the first PTC component.

9. A method of protecting a transportation vehicle electrical circuit, comprising a power source having positive and negative terminals and one or more loads, from thermal hazard, comprising:
   directing current from the power source to the load through an interruptible power circuit connected between the power source and load, the interruptible power circuit comprising a series connection of a first positive temperature coefficient (PTC) component, operative to limit current to a first predetermined current value in response to heat in excess of a first predetermined thermal value, and a bi-stable relay;
   closing the bi-stable relay;
   holding open a first normally closed output terminal of a failsafe relay, an input terminal of the failsafe relay being connected to the power source positive terminal, wherein the first normally closed output terminal is connected to a first control input of the bi-stable relay operative to open the bi-stable relay; and
   in response to the first PTC component limiting current through the interruptible power circuit, deenergizing the failsafe relay, allowing the first normally closed output terminal to connect the power source positive terminal to the bi-stable relay first control input to open the bi-stable relay.

10. The method of claim 9 wherein closing the bi-stable relay comprises momentarily connecting the power source positive terminal to a second control input of the bi-stable relay operative to close the bi-stable relay.

11. The method of claim 9 further comprising, in response to the first PTC component limiting current through the interruptible power circuit, limiting current between the relay and the bi-stable relay first control input by a second PTC component operative to limit current to a second predetermined current value in response to heat in excess of a second predetermined thermal value.

12. The method of claim 9 further comprising, in response to the first PTC component limiting current through the interruptible power circuit, energizing a visible hazard indicator.

13. The method of claim 9 further comprising, after closing the bi-stable relay and prior to the first PTC component limiting current through the interruptible power circuit, energizing a visible safe operation indicator.

* * * * *